US010789977B1

(12) United States Patent
Song et al.

(10) Patent No.: US 10,789,977 B1
(45) Date of Patent: Sep. 29, 2020

(54) SPIN ORBITAL TORQUE VIA SPIN HALL EFFECT BASED ENERGY ASSISTED MAGNETIC RECORDING

(71) Applicant: Western Digital Technologies, Inc., San Jose, CA (US)

(72) Inventors: Suping Song, Fremont, CA (US); Zhanjie Li, Pleasanton, CA (US); Terence Lam, Cupertino, CA (US); Lijie Guan, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/453,986

(22) Filed: Jun. 26, 2019

(51) Int. Cl.
*G11B 5/39* (2006.01)
*G11B 5/60* (2006.01)
*G11B 5/00* (2006.01)

(52) U.S. Cl.
CPC .......... *G11B 5/3906* (2013.01); *G11B 5/6082* (2013.01); *G11B 2005/0005* (2013.01)

(58) Field of Classification Search
CPC ..... G11B 5/3116; G11B 5/1278; G11B 5/314; G11B 5/3133; G11B 5/315; G11B 2005/0024; G11B 2005/0008; H01L 43/04; H01L 43/08; H01L 27/222; G11C 11/18; G01R 33/1284
See application file for complete search history.

(56) References Cited

U.S. PATENT DOCUMENTS

| | | | |
|---|---|---|---|
| 8,295,006 B2 * | 10/2012 | Sugano | G01R 33/1284 360/112 |
| 8,582,240 B1 | 11/2013 | Chen et al. | |
| 8,970,996 B2 | 3/2015 | Nagasaka et al. | |
| 9,099,107 B1 | 8/2015 | Igarashi et al. | |
| 9,099,119 B2 * | 8/2015 | Mihajlovic | H01L 43/06 |
| 9,196,271 B1 * | 11/2015 | Shirotori | G11B 5/3109 |
| 9,230,571 B1 | 1/2016 | Chen et al. | |
| 9,275,672 B2 | 3/2016 | Shiroishi et al. | |
| 9,361,912 B1 * | 6/2016 | Liu | G11B 5/187 |
| 9,368,135 B2 | 6/2016 | Gao | |
| 9,391,262 B1 * | 7/2016 | Nikonov | H01L 43/04 |

(Continued)

FOREIGN PATENT DOCUMENTS

| | | |
|---|---|---|
| CN | 104835510 B | 11/2017 |
| JP | 2013251042 A | 12/2013 |
| WO | 2015126326 A1 | 8/2015 |

OTHER PUBLICATIONS

Kong W.J. et al.; "Spin-orbit Torque Switching in a T-type Magnetic Configuration with Current Orthogonal to Easy Axes" Nature Communications, 10:233; https://www.ncbi.nlm.nih.gov/pmc/articles/PMC6335407; Jan. 16, 2019 (9 pages).

(Continued)

*Primary Examiner* — Brian E Miller
(74) *Attorney, Agent, or Firm* — Patterson & Sheridan, LLP; Steven H. Versteeg

(57) ABSTRACT

A magnetic recording head includes a trailing shield, a main pole, and a spin Hall layer. The spin Hall layer is disposed between the trailing shield and the main pole. A first spin torque layer is disposed between the spin Hall layer and the trailing shield. A second spin torque layer is disposed between the spin Hall layer and the main pole.

23 Claims, 8 Drawing Sheets

(56) References Cited

U.S. PATENT DOCUMENTS

| | | | |
|---|---|---|---|
| 9,741,414 B2 | 8/2017 | Qiu et al. | |
| 9,881,637 B1 | 1/2018 | Wilson et al. | |
| 9,947,347 B1* | 4/2018 | Van Der Heijden | G11B 5/372 |
| 10,014,012 B1* | 7/2018 | Song | G11B 5/315 |
| 10,121,497 B1 | 11/2018 | Takahashi et al. | |
| 10,157,632 B1 | 12/2018 | Song et al. | |
| 10,181,334 B1* | 1/2019 | Song | G11B 5/314 |
| 10,186,284 B2 | 1/2019 | Narita et al. | |
| 10,210,888 B1* | 2/2019 | Li | G11B 5/3116 |
| 10,229,723 B1* | 3/2019 | Choi | G11C 11/161 |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 10,403,309 B2* | 9/2019 | Li | G11B 5/1278 |
| 10,559,318 B1* | 2/2020 | Chen | G11B 5/11 |
| 10,580,441 B1* | 3/2020 | Chen | G11B 5/6082 |
| 10,650,847 B2* | 5/2020 | Li | G11B 5/37 |
| 2008/0304176 A1 | 12/2008 | Takagishi et al. | |
| 2009/0059423 A1 | 3/2009 | Yamada et al. | |
| 2009/0161265 A1* | 6/2009 | Sugano | G01R 33/1284 360/324 |
| 2009/0310244 A1 | 12/2009 | Shimazawa et al. | |
| 2010/0061014 A1* | 3/2010 | Das | G11B 5/374 360/112 |
| 2013/0250456 A1 | 9/2013 | Yamada et al. | |
| 2014/0139952 A1 | 5/2014 | Takeo et al. | |
| 2014/0177100 A1 | 6/2014 | Sugiyama et al. | |
| 2014/0226239 A1* | 8/2014 | Mihajlovic | H01L 43/06 360/112 |
| 2015/0287426 A1* | 10/2015 | Mihajlovic | G11B 5/3932 428/816 |
| 2016/0027455 A1 | 1/2016 | Kudo et al. | |
| 2017/0236537 A1 | 8/2017 | Murakami et al. | |
| 2018/0268848 A1 | 9/2018 | Narita et al. | |
| 2019/0088274 A1 | 3/2019 | Narita et al. | |
| 2019/0279665 A1* | 9/2019 | Li | G11B 5/372 |

OTHER PUBLICATIONS

Koga, R.; "Increase in AC-Field Frequency and Recording Performance in Mircowave-Assisted Magnetic Recording", Journal of the Magnetics Society of Japan, vol. 40, No. 2; 2016 (6 pages).

Yoshida, Kazuetsu et al.: "Spin Torque Oscillator with Negative Magnetic Anisotropy Materials for MAMR"Jornals & Magazines, IEEE Transactions on Magnetics, vol. 46, Issue 6; https://ieeexplore.ieee.org/document/5467471 (2 pages).

Yoshida, Kazuetsu et al; "Spin Torque Oscillator with Negative Magnetic Anisotropy Materials for MAMR"; IEEE Transactions on Magnetics, vol. 46, No. 6, Jun. 2010, pp. 2466-2469 (4 pages).

Mallory, Mike et al; "Head and Media Challenges for 3 Tb/in2 Microwave-Assisted Magnetic Recording"; IEEE Transactions on Magnetics, vol. 50, No. 7, Jul. 2014 (8 pages).

\* cited by examiner

SPIN ORBITAL TORQUE VIA SPIN HALL EFFECT BASED ENERGY ASSISTED MAGNETIC RECORDING

BACKGROUND OF THE DISCLOSURE

Field of the Disclosure

Embodiments of the present disclosure generally relate to data storage devices, and more specifically, to a magnetic media drive employing an energy assisted write head based upon spin-orbital torque.

Description of the Related Art

Over the past few years, microwave assisted magnetic recording (MAMR) has been studied as a recording method to improve the areal density of a magnetic media device, such as a hard disk drive (HDD). One type of MAMR enabled magnetic recording is based on spin-transfer torque (STT). During operation, electrical current flows from the main pole to the trailing shield through a field generation layer. Transmitted polarized electrons from a spin polarization layer and/or from reflected electrons are injected into the field generation layer causing switching or precession of the magnetization of the field generation layer by spin transfer torque (STT) from the injected electrons. Switching or precession of the magnetization of the field generation layer generates an assisting field to the write field.

Another type of energy assisted magnetic recording is based on spin-orbital torque (SOT). During operation, charge current through a spin Hall layer generates a spin current in the spin Hall layer. The spin orbital coupling of the spin Hall layer and a spin torque layer (STL) causes switching or precession of magnetization of the STL by the spin orbital coupling of the spin current from the spin Hall layer. Switching or precession of the magnetization of the STL can generate an assisting DC field or AC field to the write field. Energy assisted write heads based on SOT have multiple times greater power efficiency in comparison to MAMR write heads based on STT.

FIG. 1 is one example of a cross-sectional view of an energy assisted write head 10 based on SOT. A SOT structure 50 is disposed between a trailing shield 40 and a main pole 20. The SOT structure 50 comprises a spin-torque layer (STL) 71 disposed below a spin Hall layer 52. In manufacturing the write head 10, the trailing shield 40, the main pole 20, and the STL 71 are planarized by a lapping tool at a media facing surface of the write head. The spin-torque layer 71 is formed to a sufficient thickness 71T so that the spin-torque layer 72 remains after planarization since the uniformity and amount of planarization are difficult to control. However, if the thickness 71T of the STL 70 that remains after planarization is too large, switching of the magnetization direction of the STL 71 is low or none existent since SOT is a surface phenomenon of the spin Hall layer 52 acting on the STL 71. A low or non-existent switching of the magnetization direction of the STL results in generation of low or none existent assisting DC field. Therefore, there is a need for an improved energy assisted write head based on SOT.

SUMMARY OF THE DISCLOSURE

In one embodiment, a magnetic recording head includes a trailing shield, a main pole, and a spin Hall layer. The spin Hall layer is disposed between the trailing shield and the main pole. A first spin torque layer is disposed between the spin Hall layer and the trailing shield. A second spin torque layer is disposed between the spin Hall layer and the main pole.

In another embodiment, a magnetic recording head includes a trailing shield, a main pole, and a coil around the main pole. A spin Hall layer is disposed between the trailing shield and the main pole. A trailing-shield-facing spin torque layer is disposed between the spin Hall layer and the trailing shield. A main-pole-facing spin torque layer is disposed between the spin Hall layer and the main pole. The spin Hall layer is adapted to transmit a charge current in a cross-track direction between the trailing shield and the main pole.

In still another embodiment, a magnetic recording head includes a trailing shield, a main pole, and a spin Hall layer. The spin Hall layer is disposed between the trailing shield and the main pole. A first spin torque layer (STL) is disposed between the spin Hall layer and the trailing shield. A second spin torque layer (STL) is disposed between the spin Hall layer and the main pole. A first charge current blocking layer is disposed between the first STL and the spin Hall layer. A second charge current blocking layer is disposed between the second STL and the spin Hall layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments relate to a magnetic media drive employing an energy assisted write head based upon spin-orbital torque (SOT). A magnetic recording or write head includes a first spin torque layer (STL) between a spin Hall layer and a trailing shield and/or a second STL between a spin Hall layer and a main pole to produce an assisting DC field to a recording medium surface.

Figure 2:
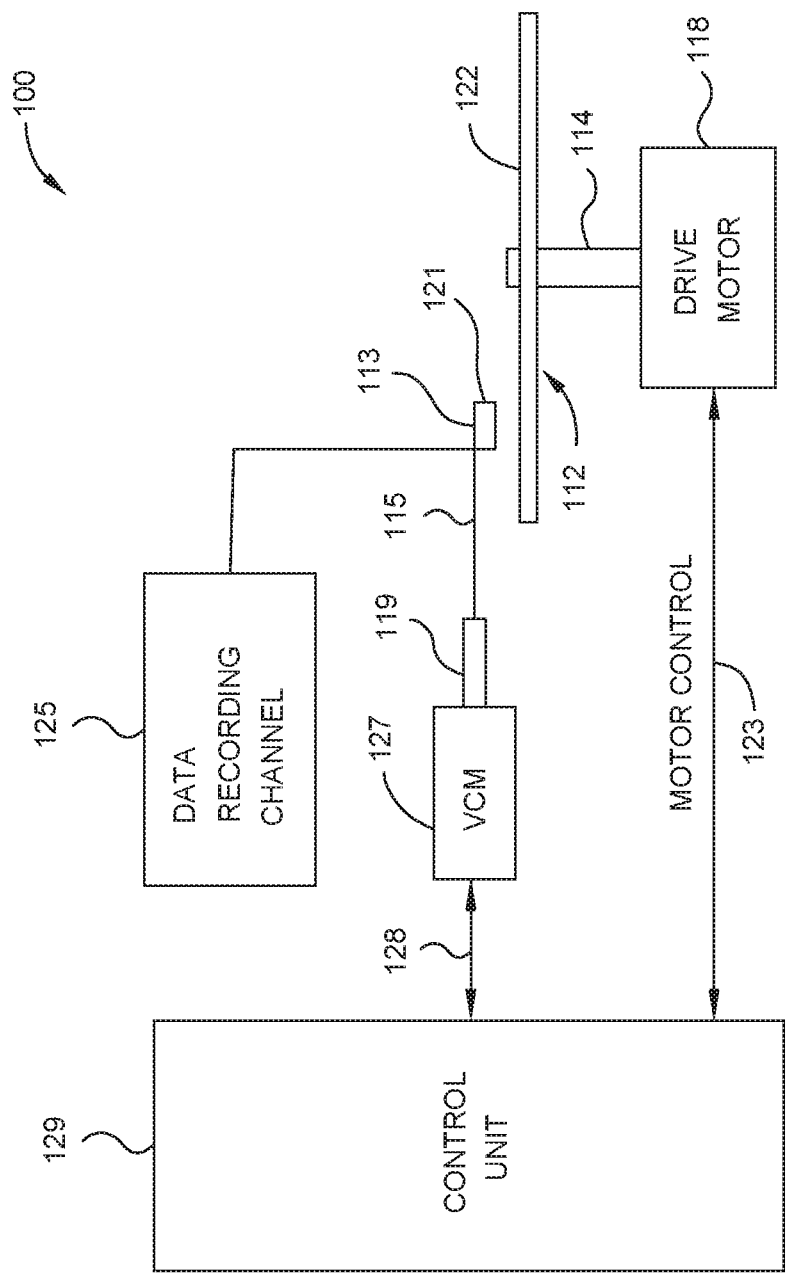
FIG. 2 is a schematic illustration of a data storage device such as a magnetic media device.

FIG. 2 is a schematic illustration of a data storage device such as a magnetic media device. Such a data storage device may be a single drive/device or comprise multiple drives/devices. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include a spin Hall structure for generating SOT. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 2 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 2 are for representation purposes only. It should be apparent that magnetic media devices may contain a large number of media, or disks, and actuators, and each actuator may support a number of sliders.

Figure 3:
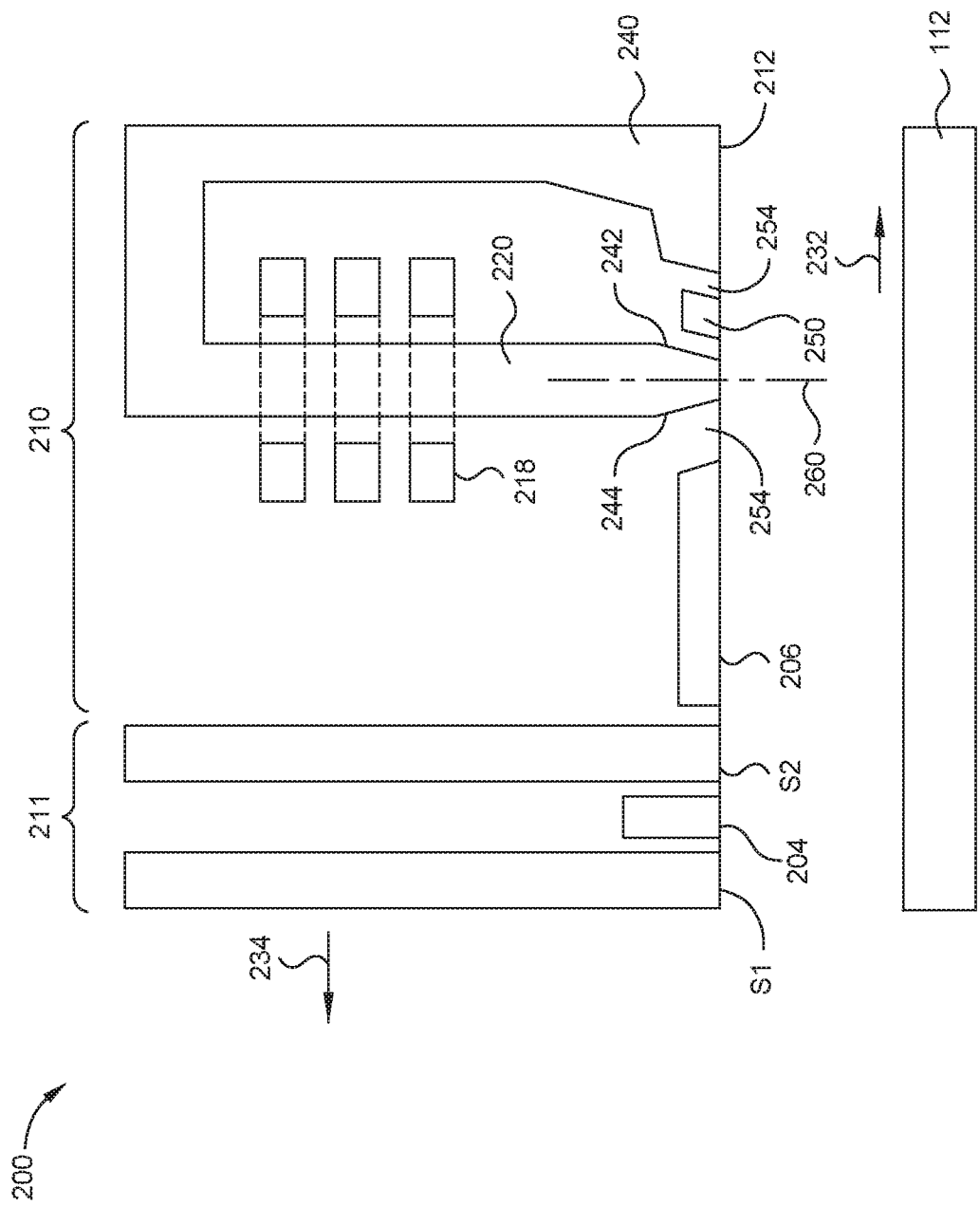
FIG. 3 is a fragmented, cross-sectional side view of a read/write head facing the magnetic disk according to certain embodiments.

FIG. 3 is a fragmented, cross-sectional side view of a read/write head 200 facing the magnetic disk 112 according to certain embodiments. The read/write head 200 may correspond to the magnetic head assembly 121 described in FIG. 1. The read/write head 200 includes a MFS 212, such as an air bearing surface (ABS), facing the disk 112, a magnetic write head 210, and a magnetic read head 211. As shown in FIG. 3, the magnetic disk 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic disk 112 are detectable by the MR (or MTJ) sensing element 204 as the recorded bits.

The write head 210 includes a main pole 220, a leading shield 206, a trailing shield 240, a spin orbital torque (SOT) structure 250, and a coil 218 that excites the main pole 220. The coil 218 may have a "pancake" structure which winds around a back-contact between the main pole 220 and the trailing shield 240, instead of a "helical" structure shown in FIG. 3. The SOT structure 250 is formed in a gap 254 between the main pole 220 and the trailing shield 240. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material such as a FeCo alloy. The leading shield 206 and the trailing shield 240 may be a magnetic material, such as NiFe alloy.

Figure 4A:
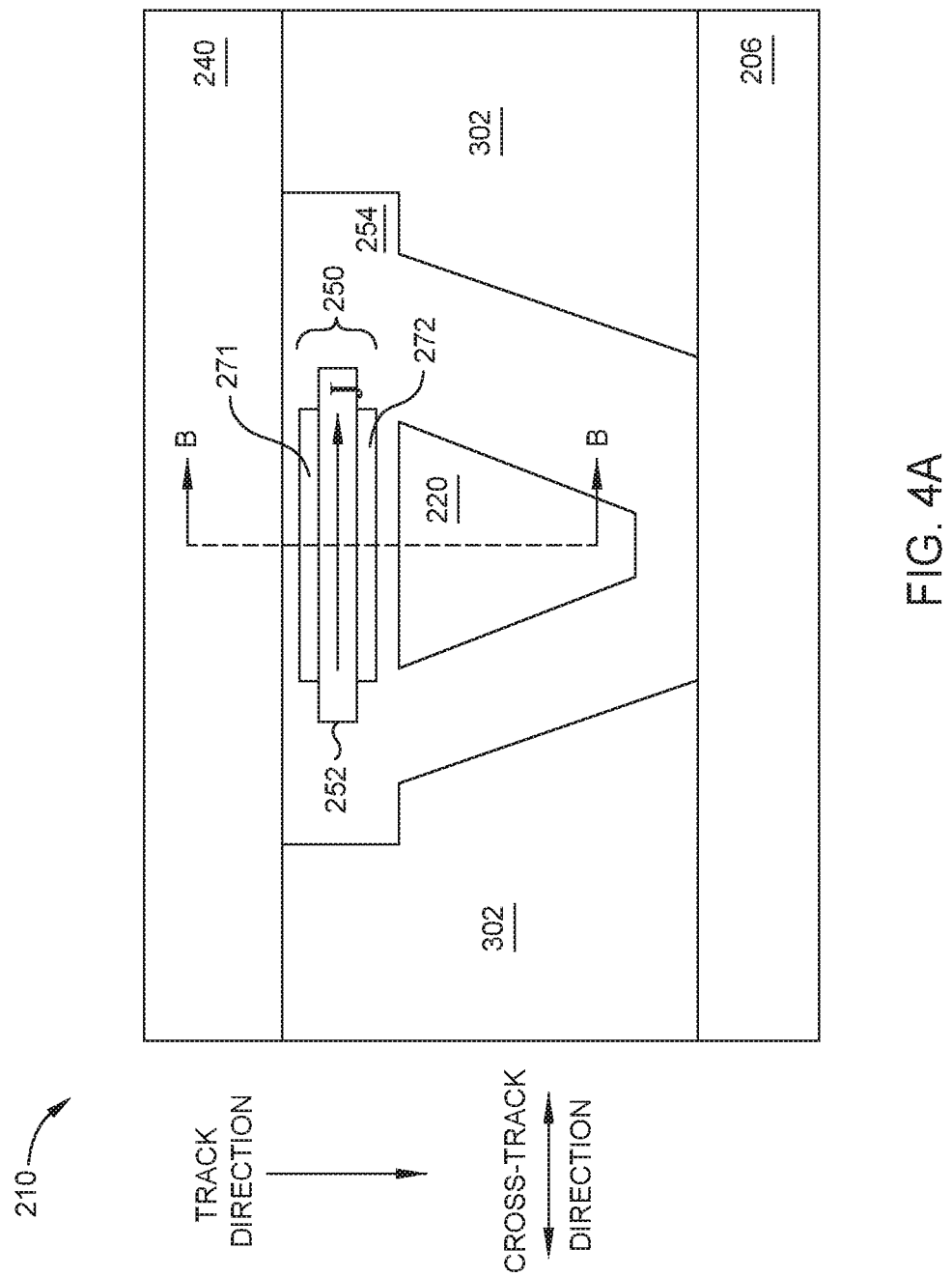
FIG. 4A is a schematic MFS view of certain embodiments of a portion of a write head.
Figure 4B:
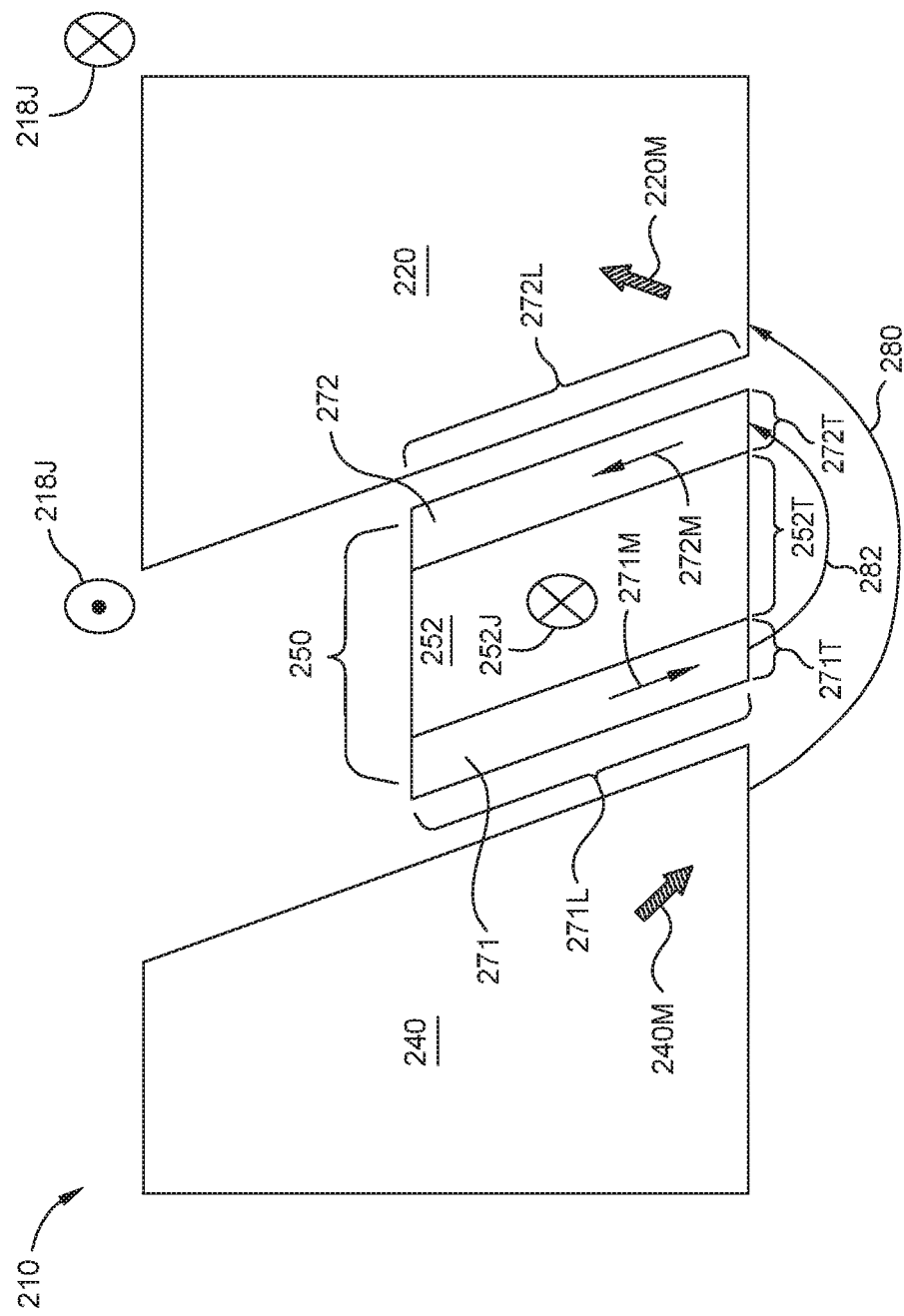
FIG. 4B is a fragmented, cross-sectional side view of certain embodiments of the write head along plane B-B of FIG. 4A.

FIG. 4A is a schematic MFS view of certain embodiments of a portion of a write head 210, such as the write head of FIG. 3 or other suitable magnetic media drives. FIG. 4B is a fragmented, cross-sectional side view of certain embodiments of the write head 210 along plane B-B of FIG. 4A. As shown in FIGS. 4A-B, the write head 210 includes a SOT structure 250 between a trailing shield 240 and a main pole 220 having a trailing taper. As shown in FIG. 4A, the write head 210 further includes side shields 302 sandwiching the main pole 220 along the cross-track direction and a leading shield 206 in a track direction. The side shields 302 can be in direct contact with the leading shield 206 and the trailing shield 240.

The SOT structure 250 comprises a spin Hall layer 252, a first spin-torque layer (STL) 271 proximate between the spin Hall layer 252 and the trailing shield 240, and a second STL 272 between the spin Hall layer 252 and the main pole 220. The first STL 271 can also be referred to as a trailing-shield-facing STL, and the second STL 272 can also be referred to as a main-pole-facing STL.

The spin Hall layer 252 comprises a heavy metal, such as beta phase tungsten (β-W), beta phase Tantalum (β-Ta), platinum (Pt), hafnium (Hf), a heavy metal alloy of tungsten with hafnium, and/or iridium, an alloy of tellurium (Te) with bismuth (Bi) and/or antimony (Sb), bismuth doped copper, antiferromagnetic materials, and multiple layers thereof. Examples of antiferromagnetic materials include MnIr, XMn (X=Fe, Pd, Ir, and Pt), and other Cu—Au—I type antiferromagnets. In certain embodiments, the spin Hall layer 252 is formed to a thickness 252T (FIG. 4B) from about 3 nm to about 8 nm.

In certain embodiments, the STLs 271, 272 each comprise a negative magnetic anisotropy constant ($K_u$) material. An example of a negative $K_u$ STL are one or more layers of CoFe, CoIr, NiFe, or CoFeX alloy wherein X=B, Ta, Re, Ir. In certain embodiments, the STLs 271, 272 each comprises one or more layers of CoFe. The STLs 271, 272 can be the same or different negative $K_u$ materials. A negative $K_u$ STL switches in-plane under influence from spin-orbital torque from a spin Hall layer. In certain embodiments, each STL 271, 272 is formed to a thickness 271T, 272T from about 3 nm to about 5 nm.

During operation, a charge current flows through the spin Hall layer 252 generating SOT. The SOT generated by the spin Hall layer 252 induces magnetization switching of magnetization of the STLs 271, 272. In some embodiments, the SOT structure 250 has an effective spin injection efficiency (β) of about 0.3 to 0.6, about 2 to 6 times larger than that of a head using a SST pseudo spin-valve structure (having an effective spin injection efficiency (β) of about 0.1 to 0.3). Higher effective spin injection efficiency leads to reduced critical switching current density, which is defined by the equation (1):

$$J_{C0} \approx \frac{2e}{\hbar} \mu_0 M_S t \alpha (H_C + M_{eff}/2)/\beta \quad (1)$$

Based on equation (1), the 2 to 6 times increase in effective spin injection efficiency (β) for the SOT based head leads to a reduction of the critical switching current density by 2 to 6 times, which in turn brings a higher energy efficiency. Furthermore, the strong SOT generated by the spin Hall layer 252 enforces in-plane magnetization oscillation in the STLs 271, 272, and the strong SOT utilizes less current flowing through the spin Hall layer 252, leading to improved reliability due to less joule heating.

As shown in FIG. 4B, the magnetization direction 220M of the main pole 220 and the magnetization direction 240M of the trailing shield 240 is determined by the coil 218 (FIG. 3) around the body of the main pole 220. The direction of the charge current 218J is shown schematically by a dot representing charge current coming out of the plane of the figure and an X representing charge current coming into the plane of the figure. A write field 280 is generated between the main pole 230 and the trailing shield 240 acting as a return pole.

A charge current 252J directed through the spin Hall layer 252 in a direction represented by an X into the plane of the figure results in a switching of the magnetization in a general direction 271M of the first STL 271 and results in a switching of the magnetization in a general direction 272M of the second STL 272. The magnetization direction 271M of the first STL 271 is pointed in generally the same direction as the magnetization direction 240M of the trailing shield 240. The magnetization direction 272M of the second STL 272 is generally pointed in the same direction as the magnetization direction 220M of the main pole 220. A DC magnetic field 282 is generated by the STLs 271, 272 pointed generally the same direction as the write field 280.

In certain embodiments, as shown in FIG. 4B, the spin Hall layer 252, the first STL 271, and the second STL 272 form a flat surface at a media facing surface of the write head 210 so that the SOT structure 250 can be close to a recording medium. In certain embodiments, as shown in FIG. 4B, the spin Hall layer 252, the first STL 271, the second STL 272, the trailing shield 240, and the main pole 220 form a flat surface at a media facing surface of the write head so that the write head can be close to a recording medium surface.

Figure 5A:
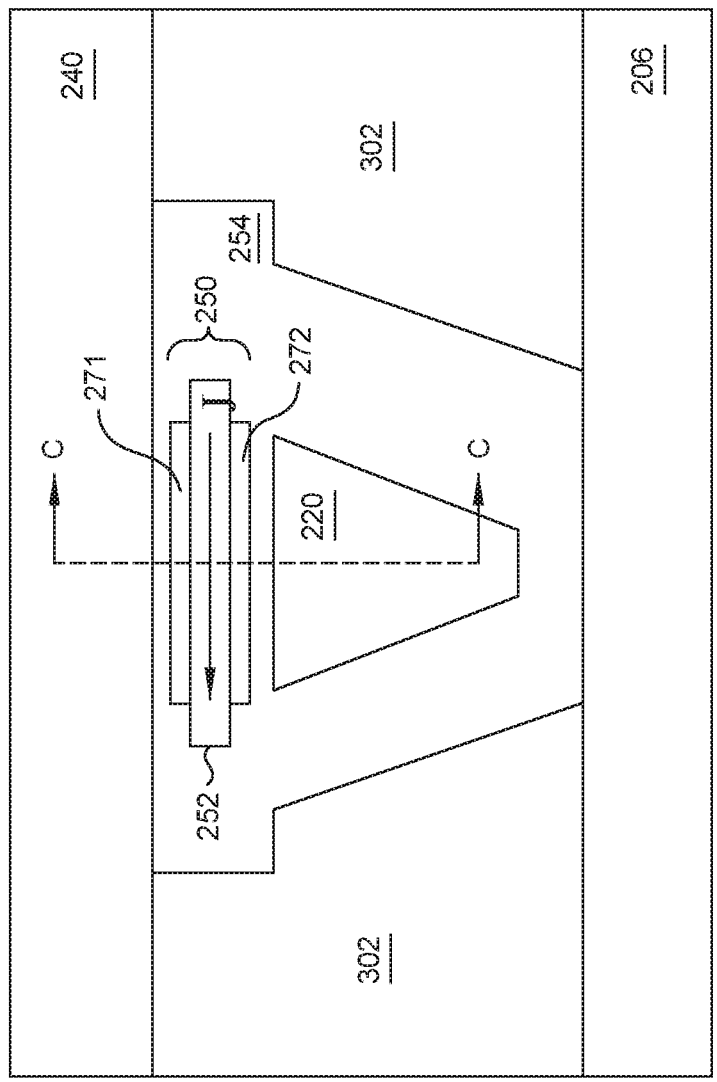
FIG. 5A is a schematic MFS view of certain embodiments of a portion of a write head.
Figure 5B:
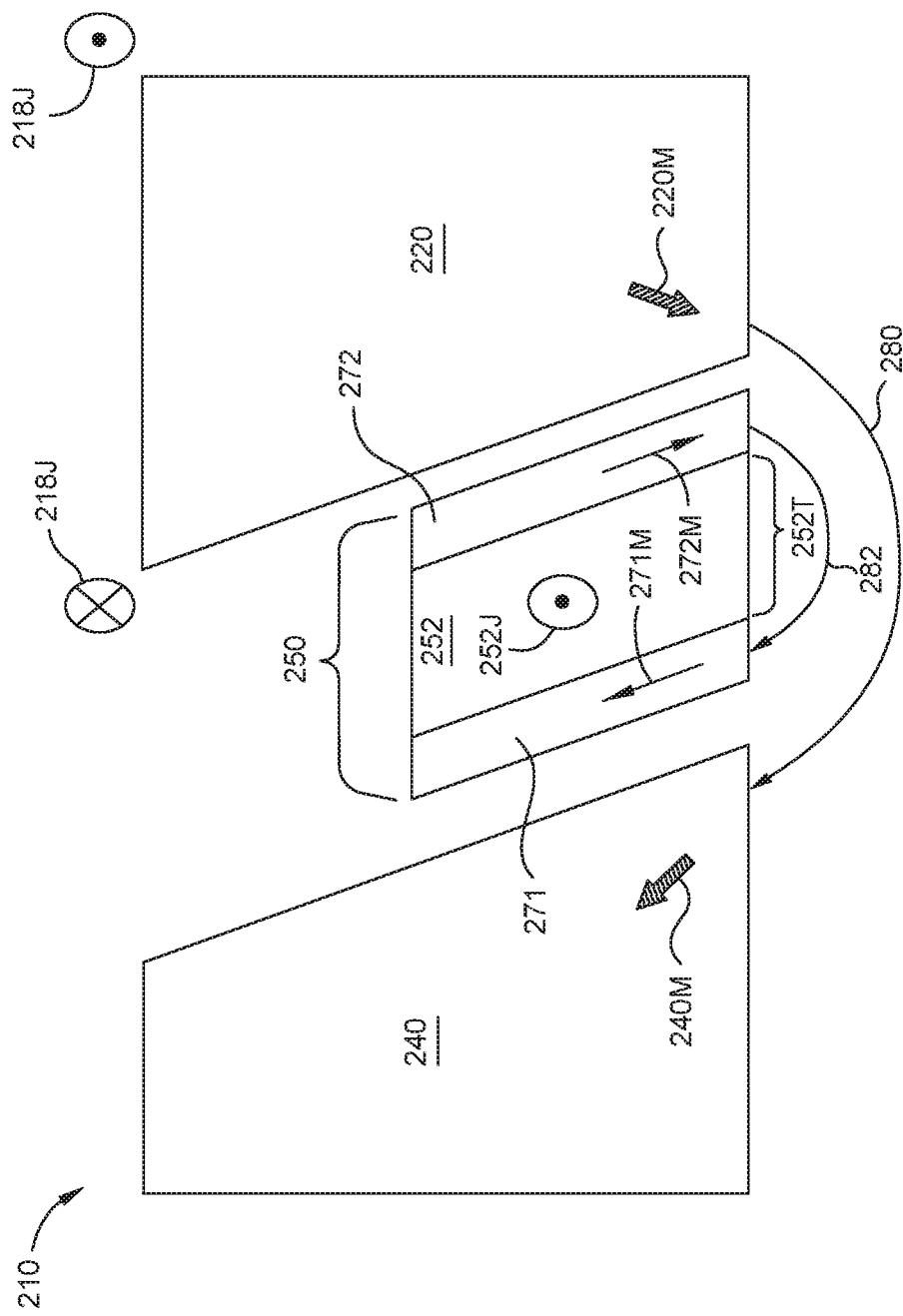
FIG. 5B is a fragmented, cross-sectional side view of certain embodiments of the write head along plane C-C of FIG. 5A.

FIG. 5A is a schematic MFS view of certain embodiments of a portion of the write head 210 of FIG. 4A with a charge current 252J flowing in the reverse direction. FIG. 5B is a fragmented, cross-sectional side view of certain embodiments of the write head 210 along plane C-C of FIG. 5A.

As shown in FIG. 5B, the direction of the charge current 218J of the coil 218 is reversed in comparison to FIG. 4B resulting in reversing the magnetization direction 220M of the main pole 220 and the magnetization direction 240M of the trailing shield 240 and reversing the direction of the write field 280. The direction of the charge current 252J directed through the spin Hall layer 252 is reversed in comparison to FIG. 4B resulting in reversing the direction of the DC magnetic field 282 to be pointed in generally the same direction as the write field 280.

As shown in FIGS. 4A-B, 5A-B, the SOT structure 250 comprises the spin Hall layer 252 in direct contact with the first STL 271 and the second STL 272 in certain embodiments. In certain embodiments, the spin Hall layer 252 can comprise a material that has a higher charge conductivity than the first STL 271 and the second STL 272 to reduce charge current shunting through the first STL 271 and the second STL 272.

Figure 6:
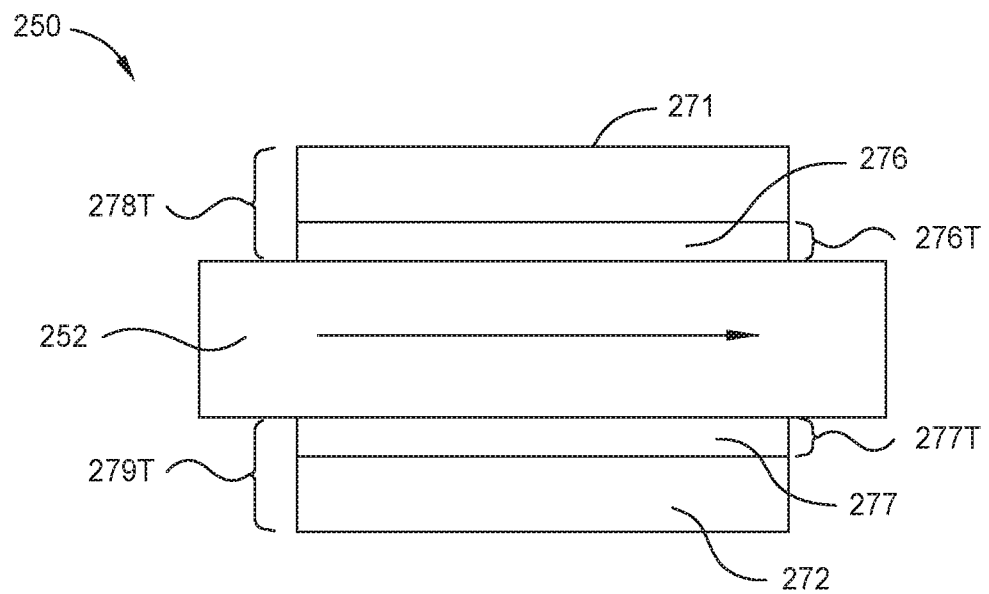
FIG. 6 is a schematic MFS view of certain embodiments of a SOT structure.
Figure 7:
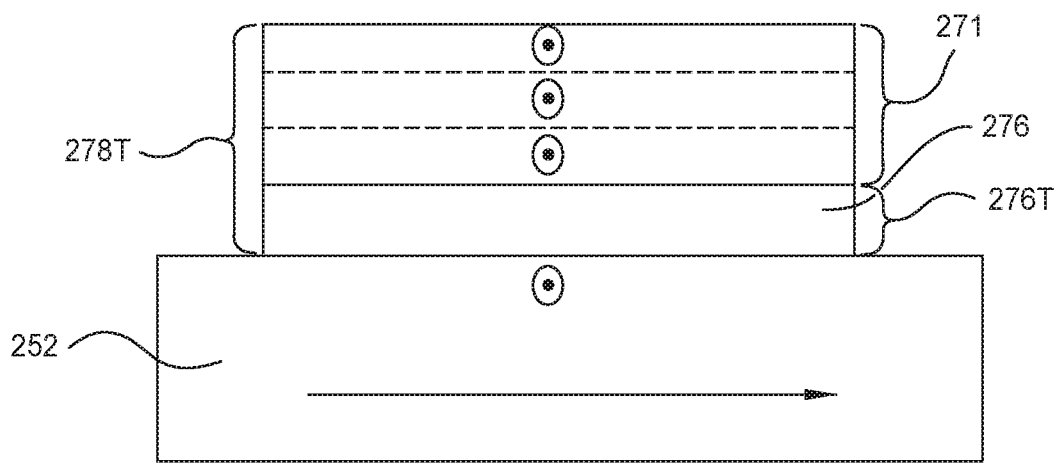
FIG. 7 is a schematic MFS view of certain embodiments of a SOT structure having an STL comprising multiple layers of one or more ferromagnetic materials.

FIG. 6 is a schematic MFS view of certain embodiments of a SOT structure 250 comprises one or more intervening layers between the spin Hall layer 252 and each STLs 271, 272. The spin Hall layer 252 can comprise a material that has a lower or higher charge conductivity than the first STL 271 and the second STL 272. The SOT structure 250 comprises a first charge current blocking layer 276 between a first STL 271 and a spin Hall layer 252 and a second charge current blocking layer 277 between a second STL 272 and the spin Hall layer 252. The first and second charge current blocking layers 276, 277 comprise a material that is a good charge current insulator but a good spin current conductor. Materials that are a good charge current insulator but a good spin current conductor include magnesium oxide, yttrium iron garnet, and other suitable materials. The charge current blocking layers 276, 277 reduce or prevent the charge current through the spin Hall layer 252 from electrically shunting through the STLs 271, 272. If charge current is shunted through the STLs 271, 272, then less spin current will be generated by the spin Hall layer 252. In certain embodiments, the first charge current blocking layer 276 and the second charge current blocking layer 277 are each formed to a thickness 276T, 277T from about 0.5 nm to about 1.5 nm FIG. 7 is a schematic MFS view of certain embodiments of a SOT structure 250 having an STL 271 comprising multiple layers 271 of one or more ferromagnetic materials. Although three layers 271 are shown in FIG. 7, the STL 271 can comprise of two or more layers 271. The ferromagnetic multiple layers 271 can be ferromagnetic materials of an anisotropy (positive or negative). Each of the ferromagnetic multiple layers 271 can comprise the same or different ferromagnetic materials. In certain embodiments, the ferromagnetic multiple layers 271 comprises the same negative anisotropy ferromagnetic material. The multiple layers 271 can provide increased in-plane switching in comparison to a bulk STL layer. The multiple layers 271 do not require any intervening layers between the multiple layers 271 to provide increased in-plane switching. Although the SOT structure 250 in FIG. 7 is shown as including one STL 271, the SOT structure 250 may further include another STL.

The write heads 210 of FIGS. 3, 4A-B, and 5A-B may further comprise other components. For example, the gap 254 surrounding the main pole 220 may be filled with a dielectric material. In another example, the trailing shield 240 may further comprises a trailing shield hot seed layer proximate to the SOT structure 250.

The SOT structures 250 of FIGS. 4A-B, 5A-B, and 6 have been described as having a SOT structure 250 comprising a first STL 271 facing the trailing shield 240 and a second STL 272 facing the main pole 220 in certain embodiments. In other embodiments, the SOT structure 250 comprises a single STL. For example, in certain embodiments, the SOT structure comprising just a trailing-shield-facing STL between a spin Hall layer and a trailing shield without another STL. For example, in another embodiment, the SOT structure comprising just a main-pole-facing STL between a spin Hall layer and a main-pole without another STL.

As shown in FIGS. 4A-B, 5A-B, a SOT structure 250 without any charge current blocking layers comprises a first STL 271 between a spin Hall layer 252 and a trailing shield 240 and a second STL 272 between the spin Hall layer 252 and the main pole 220. The first STL 271 and/or the second STL 272 can be each formed to a thickness 271T, 272T of about 5 nm or less in certain embodiments. As shown in FIG. 6, a SOT structure 250 comprises a first STL 271 between a spin Hall layer 252 and a trailing shield 240 and a second STL 272 between the spin Hall layer 252 and the main pole 220. A charge current blocking layers 276 is between the first STL 271 and the spin Hall layer 252 and a charge current blocking layer 277 is between the second STL 272 and the spin Hall layer 252. In certain embodiments, the total thickness 278T of the first STL 271 with the charge current blocking layers 276 and/or the total thickness 279T of the second STL 272 with the charge current blocking layers 277 can be about 5 nm or less. As shown in FIG. 7, a SOT structure 250 having a STL 271 formed from multiple layers 271 can be formed to a total thickness 278T with or without a charge current blocking layer 276 of about 5 nm or less. Without being bound by theory unless specifically set forth in the claims, it is believed that a distance of about 5 nm is the magnetic exchange length for SOT from the spin Hall layer 252 to the STL 271 since SOT is a surface phenomenon of the spin Hall layer 252. Although a thicker STL than the magnetic exchange length can be used, only a portion of the STL proximate the spin Hall layer 252 will experience SOT. As a result, the magnetic switching of the thicker STL will not be possible.

Figure 1:
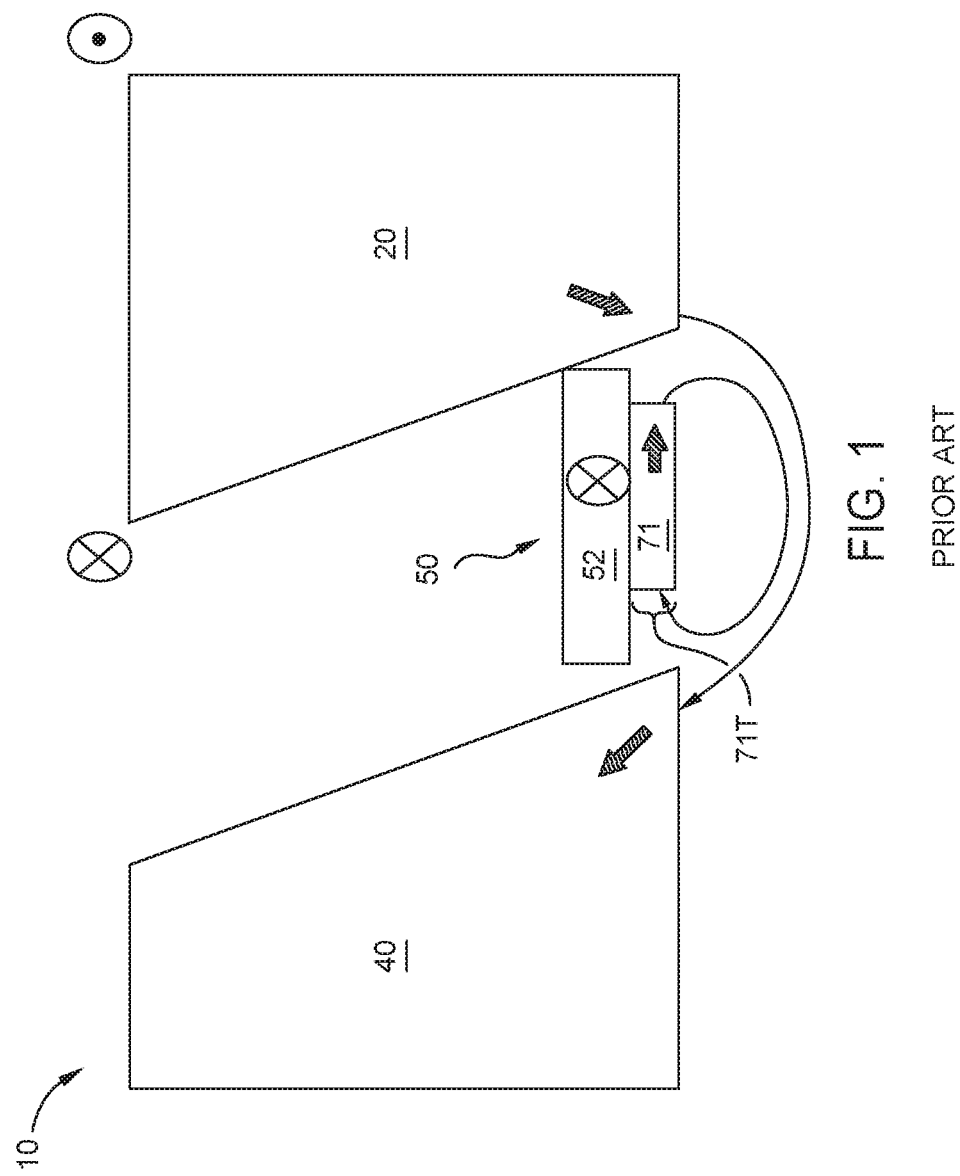
FIG. 1 is one example of a cross-sectional view of an energy assisted write head based on SOT.

In certain embodiments, a length 271L, 272L of the STLs 271, 271 of FIGS. 4A-B, 5A-B, 6, and 7 can be made to any suitable dimension since this dimension is less impacted by planarization of the write head in comparison to the planarization of the write head of FIG. 1. In certain embodiments, the length 271L, 272L is formed to a dimension of about 30 nm or more, such as about 30 nm to about 60 nm.

In certain embodiments, a negative magnetic anisotropy constant ($K_u$) material between a spin Hall layer and trailing shield and/or between a spin Hall layer and main pole generates a greater assisting magnetic field at a recording medium surface due to its in-plane switching in comparison of out-of-plane switching of positive magnetic anisotropy constant (Ku) materials. A SOT structure with a STL of a positive magnetic anisotropy constant (Ku) material with out-of-plane switching may cause an adverse shunting effect of the write field between the main pole 220 and the trailing shield.

Embodiments relate to a magnetic media drive employing an energy assisted write head based upon spin-orbital torque (SOT). A magnetic recording or write head includes a first spin torque layer (STL) between a spin Hall layer and a trailing shield and/or a second STL between a spin Hall layer and a main pole to produce an assisting DC field to a recording medium surface. In certain aspects, the SOT structure can planarized in a manufacturing environment without inadvertently removing or over planarizing the STL.

In one embodiment, a magnetic recording head includes a trailing shield, a main pole, and a spin Hall layer. The spin Hall layer is disposed between the trailing shield and the main pole. A first spin torque layer is disposed between the spin Hall layer and the trailing shield. A second spin torque layer is disposed between the spin Hall layer and the main pole.

In another embodiment, a magnetic recording head includes a trailing shield, a main pole, and a coil around the main pole. A spin Hall layer is disposed between the trailing shield and the main pole. A trailing-shield-facing spin torque layer is disposed between the spin Hall layer and the trailing shield. A main-pole-facing spin torque layer is disposed between the spin Hall layer and the main pole. The spin Hall layer is adapted to transmit a charge current in a cross-track direction between the trailing shield and the main pole.

In still another embodiment, a magnetic recording head includes a trailing shield, a main pole, and a spin Hall layer. The spin Hall layer is disposed between the trailing shield and the main pole. A first spin torque layer (STL) is disposed between the spin Hall layer and the trailing shield. A second spin torque layer (STL) is disposed between the spin Hall layer and the main pole. A first charge current blocking layer is disposed between the first STL and the spin Hall layer. A second charge current blocking layer is disposed between the second STL and the spin Hall layer.

EXAMPLES

A perpendicular magnetic recording write head without a SOT or a MAMR structure (referred to in the examples as a "PMR") and an energy assisted recording write head based on SOT of FIGS. 4A-B, 5A-B (referred to in the examples as "SOT") were modeled. The SOT write head was modeled to have a STL with a saturation magnetization ($M_s$) of 2.2 T. The write heads were each modelled to have a magnetic core width of 58 nm as the magnetic flux footprint to a magnetic recording medium. The properties of the modelled write heads are shown in TABLE 1.

TABLE 1

| Write Head | $H_{eff}$ (Oe) | $H_{grad}$ (Oe/nm) | $xH_{gard}$ (Oe/nm) | Curv. (nm) | OW gain (db) | BPI gain (%) |
|---|---|---|---|---|---|---|
| PMR | 9784 | 270 | 159.3 | 5.69 | ref. | ref. |
| SOT | 9926 | 315 | 160.4 | 5.16 | 1 | 5 |

As shown in TABLE 1, the SOT write head had a higher effective magnetic field ($H_{eff}$), a higher magnetic field gradient in the down track direction ($H_{grad}$), a higher magnetic field gradient in the cross-track direction ($xH_{gard}$), a lower transition curvature, a write-ability (OW) gain, and a greater bits per inch (BPI) gain than a PMR head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a trailing shield;
   a main pole;
   a spin Hall layer between the trailing shield and the main pole;
   a first spin torque layer (STL) between the spin Hall layer and the trailing shield; and
   a second spin torque layer (STL) between the spin Hall layer and the main pole.

2. The magnetic recording head of claim 1, wherein the first STL and the second STL each comprises a negative magnetic anisotropy material.

3. The magnetic recording head of claim 1, wherein the first STL and the second STL each have a thickness from about 3 nm to about 5 nm.

4. The magnetic recording head of claim 1, wherein the spin Hall layer comprises a heavy metal selected from a group consisting of beta phase tungsten (β-W), beta phase tantalum (β-Ta), platinum (Pt), hafnium (Hf), an alloy of tungsten, an alloy of tellurium (Te), bismuth doped copper, antiferromagnetic materials, and multiple layers thereof.

5. The magnetic recording head of claim 1, wherein the thickness of the spin Hall layer is from about 3 nm to about 8 nm.

6. The magnetic recording head of claim 1, wherein the spin Hall layer, the first STL, and the second STL form a flat surface at a media facing surface of the magnetic recording head.

7. The magnetic recording head of claim 1, wherein the spin Hall layer, the first STL, the second STL, the trailing shield, and the main pole form a flat surface at a media facing surface of the magnetic recording head.

8. The magnetic recording head of claim 1, further comprising:
   a first charge current blocking layer between the first STL and the spin Hall layer and the trailing shield; and
   a second charge current blocking layer between the second STL and the spin Hall layer and the trailing shield.

9. A magnetic media drive, comprising:
   a magnetic recording head, the magnetic recording head comprising:
   a trailing shield;
   a main pole;
   a spin Hall layer between the trailing shield and the main pole;
   a first spin torque layer (STL) between the spin Hall layer and the trailing shield; and
   a second spin torque layer (STL) between the spin Hall layer and the main pole.

10. A magnetic recording head, comprising:
    a trailing shield;
    a main pole;
    a coil around the main pole:
    a spin Hall layer between the trailing shield and the main pole;
    a trailing-shield-facing spin torque layer (STL) between the spin Hall layer and the trailing shield; and
    a main-pole-facing spin torque layer (STL) between the spin Hall layer and the main pole,
    wherein the spin Hall layer is adapted to transmit a charge current in a cross-track direction between the trailing shield and the main pole.

11. The magnetic recording head of claim 10, wherein the coil is adapted to excite the main pole in a main pole magnetization direction and to excite the trailing shield in a trailing shield magnetization direction.

12. The magnetic recording head of claim 10, wherein the spin Hall layer is adapted to transmit a spin orbital torque to switch a magnetization of the trailing-shield-facing STL in a direction similar to a trailing shield magnetization direction and to switch a magnetization of the main-pole-facing STL in a direction similar to a main pole magnetization direction.

13. The magnetic recording head of claim 10, wherein the spin Hall layer is adapted to transmit a spin orbital torque to cause in-plane switching of a magnetization direction of the trailing-shield-facing STL and to cause in-plane switching of a magnetization direction of the main-pole-facing STL.

14. The magnetic recording head of claim 13, wherein the in-plane switching of the magnetization direction of the trailing-shield-facing STL and the in-plane switching of the magnetization direction of the main-pole-facing STL generates a DC field in a same direction as a write field between the main pole and the trailing shield.

15. The magnetic recording head of claim 10, wherein the spin Hall layer comprises beta phase tungsten (β-W), beta phase Tantalum (β-Ta), platinum (Pt), or combinations thereof.

16. The magnetic recording head of claim 10, wherein the trailing-shield-facing STL and the main-pole-facing STL each comprises a negative magnetic anisotropy material.

17. A magnetic media drive, comprising:
    a magnetic recording head, the magnetic recording head comprising:
    a trailing shield;
    a main pole;
    a coil around the main pole:
    a spin Hall layer between the trailing shield and the main pole;
    a trailing-shield-facing spin torque layer (STL) between the spin Hall layer and the trailing shield; and
    a main-pole-facing spin torque layer (STL) between the spin Hall layer and the main pole,
    wherein the spin Hall layer is adapted to transmit a charge current in a cross-track direction between the trailing shield and the main pole.

18. A magnetic recording head, comprising:
    a trailing shield;
    a main pole;
    a spin Hall layer between the trailing shield and the main pole;
    a first spin torque layer (STL) between the spin Hall layer and the trailing shield;

a second spin torque layer (STL) between the spin Hall layer and the main pole; a first charge current blocking layer between the first STL and the spin Hall layer; and a second charge current blocking layer between the second STL and the spin Hall layer.

19. The magnetic recording head of claim 18, wherein the first charge current blocking layer and the second charge current blocking layer each comprises a material that is a charge current insulator and a spin current conductor.

20. The magnetic recording head of claim 18, wherein the first charge current blocking layer and the second charge current blocking layer each comprises a material selected from a group consisting of magnesium oxide and yttrium iron garnet.

21. The magnetic recording head of claim 18, wherein the first charge current blocking layer and the second charge current blocking layer are each formed to a thickness from about 0.5 nm to about 1.5 nm.

22. The magnetic recording head of claim 18, wherein the spin Hall layer comprises beta phase tungsten (β-W), beta phase Tantalum (β-Ta), platinum (Pt), or combinations thereof, and wherein the first STL and the second STL each comprises one or more layers of CoFe, CoIr, NiFe, CoFeX alloy wherein X is chosen from B, Ta, Re, Ir, or combinations thereof.

23. A magnetic media drive, comprising:
a magnetic recording head, the magnetic recording head comprising:
a trailing shield;
a main pole;
a spin Hall layer between the trailing shield and the main pole;
a first spin torque layer (STL) between the spin Hall layer and the trailing shield;
a second spin torque layer (STL) between the spin Hall layer and the main pole;
a first charge current blocking layer between the first STL and the spin Hall layer; and
a second charge current blocking layer between the second STL and the spin Hall layer.

* * * * *